(12) United States Patent
Shan et al.

(10) Patent No.: US 11,282,063 B2
(45) Date of Patent: Mar. 22, 2022

(54) METHOD AND APPARATUS OF BARCODE-BASED MOBILE PROCESSING

(71) Applicant: Advanced New Technologies Co., Ltd., Grand Cayman (KY)

(72) Inventors: Bin Shan, Hangzhou (CN); Renxiao Wu, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 571 days.

(21) Appl. No.: 16/020,038

(22) Filed: Jun. 27, 2018

(65) Prior Publication Data
US 2018/0308086 A1 Oct. 25, 2018

Related U.S. Application Data

(63) Continuation of application No. PCT/CN2016/110326, filed on Dec. 16, 2016.

(30) Foreign Application Priority Data

Dec. 29, 2015 (CN) .......................... 201511020471.X

(51) Int. Cl.
G06Q 20/32 (2012.01)
G06K 7/14 (2006.01)

(52) U.S. Cl.
CPC ....... G06Q 20/3274 (2013.01); G06K 7/1413 (2013.01); G06K 7/1417 (2013.01); G06Q 20/32 (2013.01)

(58) Field of Classification Search
CPC .. G06Q 20/3274; G06Q 20/32; G06K 7/1417; G06K 7/1413
See application file for complete search history.

(56) References Cited

U.S. PATENT DOCUMENTS

2011/0191244 A1 8/2011 Dai
2011/0320347 A1* 12/2011 Tumminaro ......... G06Q 20/322
705/39
(Continued)

FOREIGN PATENT DOCUMENTS

CN 1518715 8/2004
CN 102842081 12/2012
(Continued)

OTHER PUBLICATIONS

European Extended Search Report in European Application No. 16880974.7, dated Oct. 11, 2018, 8 pages.
(Continued)

Primary Examiner — Scott S Trotter
(74) Attorney, Agent, or Firm — Fish & Richardson P.C.

(57) ABSTRACT

Techniques for providing a method of barcode-based mobile payment are described. One example method includes data indicative of a barcode is received from a barcode device in response to the barcode device scanning the barcode on a first client device requesting a service. Authentication information is determined from the received data indicative of the barcode that indicates whether the first client device corresponds to an account; in response to determining that the first client device corresponds to the account from the authentication information. An account limit is determined for the first client device from the account. A service requested amount is determined in the authentication information from the first client device and does not exceed the account limit. In response to determining the service requested amount does not exceed the account limit, data indicative of an acceptance of the requested service is transmitted to the first client device.

18 Claims, 6 Drawing Sheets

(56) References Cited

U.S. PATENT DOCUMENTS

| | | | |
|---|---|---|---|
| 2012/0166309 A1 | 6/2012 | Hwang et al. | |
| 2012/0185317 A1 | 7/2012 | Wong | |
| 2012/0330769 A1 | 12/2012 | Arceo | |
| 2014/0129422 A1* | 5/2014 | Zhou | G06Q 20/3274 705/38 |
| 2014/0229388 A1 | 8/2014 | Pereira et al. | |
| 2015/0035643 A1 | 2/2015 | Kursun | |
| 2015/0178726 A1 | 6/2015 | Wen | |
| 2015/0186863 A1 | 7/2015 | Schwalb et al. | |
| 2015/0248664 A1 | 9/2015 | Makhdumi et al. | |
| 2015/0302215 A1 | 10/2015 | Hu | |

FOREIGN PATENT DOCUMENTS

| | | | |
|---|---|---|---|
| CN | 102968715 | 3/2013 | |
| CN | 103108223 | 5/2013 | |
| CN | 103186851 | 7/2013 | |
| CN | 103825734 | 5/2014 | |
| CN | 103942680 | 7/2014 | |
| CN | 104751334 | 7/2015 | |
| CN | 104463574 | 12/2015 | |
| EP | 3399488 | 11/2018 | |
| JP | 2004094708 | 3/2004 | |
| JP | 2015197891 | 11/2015 | |
| KR | 1020110004200 | 1/2011 | |
| KR | 1020120076554 | 7/2012 | |
| KR | 20120087788 | 8/2012 | |
| KR | 1020120087788 | 8/2012 | |
| KR | 20130110808 | 10/2013 | |
| WO | WO 2014108916 | 7/2014 | |
| WO | WO 2015026126 | 2/2015 | |
| WO | WO 2015101334 | 7/2015 | |
| WO | WO 2015175619 | 11/2015 | |
| WO | WO-2016134610 A1 * | 9/2016 | H04W 12/069 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Preliminary Report on Patentability in International Application No. PCT/CN2016/110326, dated Jul. 3, 2018, 10 pages (with English Translation).

International Search Report by the International Searching Authority issued in International Application No. PCT/CN2016/110326 dated Mar. 16, 2017; 9 pages.

* cited by examiner

METHOD AND APPARATUS OF BARCODE-BASED MOBILE PROCESSING

This application is a continuation of PCT Application No. PCT/CN2016/110326, filed on Dec. 16, 2016, which claims priority to Chinese Patent Application No. 201511020471.X, filed on Dec. 29, 2015, and each application is hereby incorporated by reference in its entirety.

TECHNICAL FIELD

The present disclosure relates to the field of Internet technologies, and in particular, to method and apparatus of barcode-based mobile payment, and method and apparatus of barcode-based mobile service processing.

BACKGROUND

With the development of the mobile Internet and the popularization of mobile devices, mobile services such as mobile payment are more frequently applied in public areas such as a restaurant and a supermarket. Since a barcode contains information, a service can be processed through barcode scanning with actual applications. The barcode is widely used because of its convenience in service processing. Here, using the barcode to process a service is as follows: a barcode reader scans a barcode generated by a mobile device and uploads the scanned barcode to a server, and the server completes service processing through processes of parsing, authentication, etc. Currently, the method of barcode-based service processing has been widely applied in many public areas.

In the existing technology, when processing a service based on a barcode on a mobile device and scanned by the barcode reader, the server is subject to service rules of an account bound by the mobile device. For example, during payment, a control limit of an account is used as the upper limit to control a payment action of the mobile device. The control limit is the total limit that the account can expend. However, in a relatively short time after the mobile device is lost, severe property loss can be caused if the payment action of the mobile device is controlled by using the control limit of the corresponding account as the upper limit. Therefore, it is necessary to strengthen control on a service action of the mobile device. In addition, in the existing technology, one account can be bound with one or more mobile devices in addition to the mobile device of the current account, so that the additional bounded mobile device can request a service based on the barcode.

SUMMARY

Implementations of the present disclosure provide a method of barcode-based mobile payment, to strengthen control on mobile payment.

Implementations of the present disclosure provide an apparatus of barcode-based mobile payment, to strengthen control on mobile payment. The implementations of the present disclosure use the following technical solutions:

A method of barcode-based mobile payment includes: receiving a two-dimensional barcode used for payment in a first mobile device and scanned by a barcode reader, where the two-dimensional barcode is generated based on a unique identifier (ID) of the first mobile device and account information of an account bound with the first mobile device; and parsing the two-dimensional barcode and performing identity authentication based on the account information and the unique ID of the first mobile device obtained through parsing. After the authentication succeeds, querying a payment limit based on the unique ID of the first mobile device, where the payment limit is the maximum payment limit in a given time period and preconfigured for the first mobile device by the account bound with the first mobile device; and making payment based on the queried payment limit.

Preferably, the method further includes: updating the payment limit after the payment is completed, where the payment limit is the difference between a control limit and a billing limit, the control limit is the total payment limit in a given time period and preconfigured for the first mobile device by the account bound with the first mobile device, and the billing limit is a used limit of the first mobile device in a given time period.

Preferably, the method further includes: saving payment information after the payment is completed, where the payment information includes a payment time and a used limit.

Preferably, the parsing the two-dimensional barcode and performing identity authentication based on the account information and the unique ID of the first mobile device obtained through parsing includes: parsing the two-dimensional barcode to obtain the account information and the unique ID of the first mobile device; and querying, based on the account information and the unique ID of the first mobile device, a payment status preconfigured for the first mobile device by the account; and when the payment status is enabled, performing identity authentication based on the account information and the unique ID of the first mobile device.

Preferably, the account is bound with the first mobile device by using a second mobile device. Preferably, the first mobile device is a wearable intelligent device. Preferably, the account is bound with at least two first mobile devices.

An apparatus of barcode-based mobile payment includes a receiving unit, an authentication unit, a querying unit, and a payment unit, where the receiving unit is configured to receive a barcode used for payment in a first mobile device and scanned by a barcode reader, where the barcode is generated based on a unique ID of the first mobile device and account information of an account bound with the first mobile device; and the authentication unit is configured to: parse the barcode and perform identity authentication based on the account information and the unique ID of the first mobile device obtained through parsing; and the querying unit is configured to: after the authentication succeeds, query a payment limit based on the unique ID of the first mobile device, where the payment limit is the maximum payment limit in a given time period and preconfigured for the first mobile device by the account bound with the first mobile device; and the payment unit is configured to make payment based on the queried payment limit. Preferably, the device further includes an updating unit, and the updating unit is configured to update the payment limit after the payment is completed, where the payment limit is the difference between a control limit and a billing limit, the control limit is the total payment limit in a given time period and preconfigured for the first mobile device by the account bound with the first mobile device, and the billing limit is a used limit of the first mobile device in a given time period.

Preferably, the device further includes a recoding unit, and the recording unit is configured to save payment information after the payment is completed, where the payment information includes a payment time and a used limit.

Preferably, the authentication unit includes: an authentication subunit, configured to: parse the barcode to obtain the account information and the unique ID of the first mobile device; query, based on the account information and the unique ID of the first mobile device, a payment status preconfigured for the first mobile device by the account; and when the payment status is enabled, perform identity authentication based on the account information and the unique ID of the first mobile device.

A method of barcode-based mobile service processing, where one is bound with a plurality of mobile devices, service rules are preconfigured for each mobile device, and the method includes: receiving a barcode used for service processing in a mobile device and scanned by a barcode reader, where the barcode is generated based on a unique ID of the mobile device and account information of an account bound with the mobile device; parsing the barcode and authenticating whether the mobile device is one of the plurality of mobile devices bound with the account based on the account information and the unique ID of the mobile device obtained through parsing; if yes, querying, based on the unique ID of the mobile device, service rules preconfigured for the mobile device by the account; and performing service processing based on the service rules preconfigured for the mobile device.

Preferably, the service rules include a service status, and the performing service processing based on the service rules preconfigured for the mobile device includes: querying the service status in the service rules; and when the service status is enabled, performing service processing based on the service rules preconfigured for the mobile device.

An apparatus of barcode-based mobile service processing, where one account is bound with a plurality of mobile devices, service rules are preconfigured for each mobile device, and the device includes: a barcode receiving unit, a terminal authentication unit, a service rule querying unit, and a service processing unit, where the barcode receiving unit is configured to receive a barcode used for service processing in a mobile device and scanned by a barcode reader, where the barcode is generated based on a unique ID of the mobile device and account information of an account bound with the mobile device; and the terminal authentication unit is configured to: parse the barcode and authenticate whether the mobile device is one of the plurality of mobile devices bound with the account based on the account information and the unique ID of the mobile device obtained through parsing; the service rule querying unit is configured to: if yes, query, based on the unique ID of the mobile device, service rules preconfigured for the mobile device by the account; and the service processing unit is configured to perform service processing based on the service rules preconfigured for the mobile device.

Preferably, the service rules include a service status, and the service processing unit is configured to: query the service status in the service rules; and when the service status is enabled, perform service processing based on the service rules preconfigured for the mobile device.

In the implementations of the present disclosure, at least one of the previous technical solutions achieves the following beneficial effects: after the server receives the barcode used for payment in the mobile device, and the authentication succeeds, payment can be made based on the payment limit preconfigured for the mobile device by the account bound with the mobile device, so that the barcode-based payment action of each mobile device can be controlled by the account. Therefore, the following problem in the existing technology is resolved: Only the payment action for the account is controlled but control on the payment action of the mobile device is weak. In addition, the processing method is provided in the service processing process where one account is bound with the plurality of mobile devices.

BRIEF DESCRIPTION OF DRAWINGS

Drawings of the present specification that constitute a part of the present disclosure are used to provide further understanding of the present disclosure, and schematic implementations of the present disclosure and descriptions thereof are used to explain the present disclosure, which do not constitute an improper limitation on the present disclosure. In the drawings.

DESCRIPTION OF EMBODIMENTS

To make the objectives, technical solutions, and advantages of the present disclosure clearer, the following describes the technical solutions of the present disclosure with reference to the accompanying drawings in the implementations of the present disclosure. Apparently, the described implementations are a part rather than all of the implementations of the present disclosure. All other implementations derived by a person of ordinary skill in the existing technologies based on the implementations of the present disclosure without creative efforts shall fall within the protection scope of the present disclosure.

Before the technical solutions of the present disclosure are described in detail, for clarity, several technical terms are described first. A barcode reader, a control limit, a payment limit, a billing limit, etc. are related to the implementations of the present disclosure. The barcode reader can be a device that reads a barcode. The control limit can be the total payment limit in a given time period. For example, if the control limit is 1000 RMB per day, the total payment limit is 1000 RMB from 00:00 to 24:00 of the day. The payment limit is a limit that can be used for payment in a given time period. The billing limit is a billed limit in a given time period. In the same time period, the control limit can be the sum of the payment limit and the billing limit. For example, if the control limit is 1000 renmibi (RMB) per day, when 300 RMB is first billed, the billing limit is 300 RMB, and the payment limit is 700 RMB. Later, when 500 RMB is billed, the billing limit changes to 800 RMB, and the payment limit changes to 200 RMB. The technical solutions provided by the implementations of the present disclosure are described in detail as follows with reference to the accompanying drawings.

Implementation 1

Figure 1:
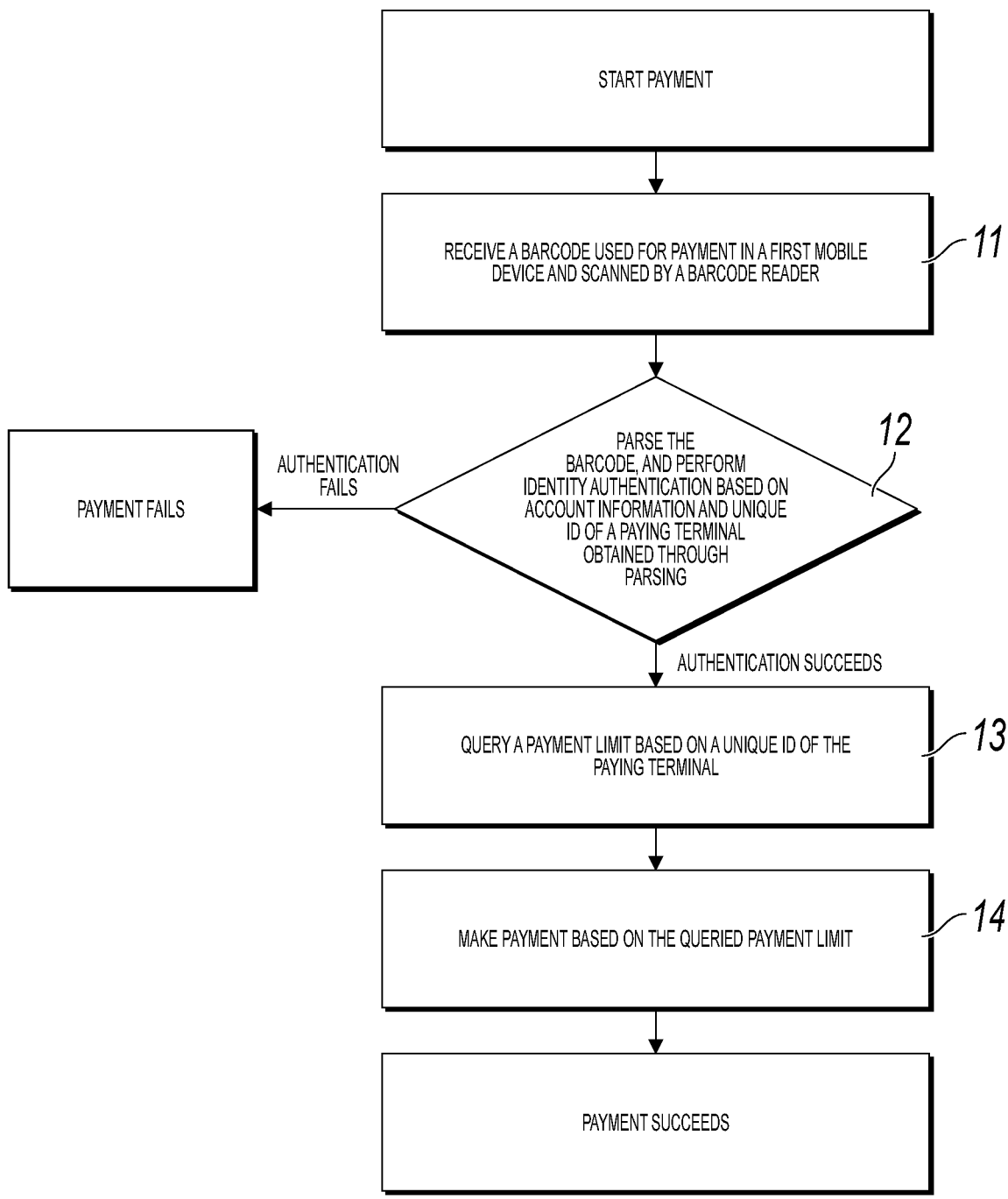
FIG. 1 is a schematic flowchart illustrating a method of barcode-based mobile payment, according to Implementation 1 of the present disclosure.

As described above, because barcode-based payment is convenient, a barcode reader has been used in many public areas to make barcode-based mobile payment. However, currently, based on the method, a control limit of an account bound with a mobile device is used as the upper limit during payment. For example, if the control limit of the account is 2000 RMB per day, the sum that all mobile devices bound with the account can pay is no more than 2000 RMB in one day. If a mobile device bound with the account is lost or stolen, someone else can make payment by using the mobile device before the account is prohibited from paying, and property loss is caused. As such, a payment solution is needed to strengthen control on a barcode-based mobile payment action. In view of this defect, a method of barcode-based mobile payment is provided to strengthen control on a payment action of a mobile device. Assume that an execution entity is a server configured to complete payment. FIG. 1 shows a schematic flowchart of the method. The method includes the following steps:

Step 11: Receive a barcode used for payment in a first mobile device and scanned by a barcode reader. In the present step, the barcode used for payment is sent to a server after the barcode reader scans the barcode used for payment on the mobile device. For example, if a mobile phone is used to perform barcode payment, the barcode reader should scan the barcode generated in the mobile phone, and send the barcode to the server configured to complete payment. The barcode in the mobile device is generated based on a unique ID of the mobile device and account information of an account bound with the mobile device. In the process that the mobile device is bound with the account, the account can be bound with the mobile device used for payment by using an application program installed on another mobile device. Therefore, the account can be bound with the first mobile device by using a second mobile device. For example, the account can be bound with a smartwatch by using an application program installed on a smartphone. As such, the smartwatch is the first mobile device, and the smartphone is the second mobile device. For ease of understanding, the first mobile device can be referred to as a paying terminal (a mobile device used for payment), and the second mobile device can be referred to as an account terminal (a mobile device that the account is located).

The unique ID of the paying terminal is an ID that uniquely identifies the paying terminal, for example, a Media Access Control (MAC) address, which is a hardware address, or a Universally Unique ID (UUID), which is a number generated on a terminal and unique to the terminal. The paying terminal ID can directly be a MAC address, a UUID, or a combination thereof, or can be generated by applying a transcoding algorithm to the MAC address and the UUID. In addition to the MAC address and the UUID, the ID can include a hardware type (smartphone, smartwatch, etc.), a model, a hardware parameter (screen size, color, etc.), etc. of the mobile device, which are intended to distinguish a mobile device from other mobile devices and express uniqueness of the terminal.

The paying terminal ID needs to be bound with the account by using the account terminal, so that a mapping relationship exists between the paying terminal ID and the account. The account information of the account bound with the paying terminal ID and the paying terminal ID are stored in the server, to help identity authentication during payment. For example, if the paying terminal ID is "abcd", and a name of the account bound with the paying terminal ID is "1234", a mapping relationship between "abcd" and "1234" is stored in the server, to help identity authentication during payment. It is worthwhile to note that one account can be bound with a plurality of paying terminals. For example, if paying terminal IDs "abcd" and "efgh" are both bound with the account name "1234", a mapping relationship between "1234" and each of "abcd" and "efgh" is stored in the server.

The barcode can be generated based on the paying terminal ID and the account information of the account bound with the paying terminal. The process of generating a barcode based on information is a common knowledge to a person skilled in the existing technologies. Details are not described here.

In the receiving process, a connection is established between the barcode reader and the server through a network for (wired or wireless) transmission, which is a basic data transmission technology.

It is worthwhile to note that the barcode can include a one-dimensional barcode and a two-dimensional barcode. The one-dimensional barcode is also referred to as a barcode (barcode), which is a graphic ID used to express information and including a plurality of black strips and spacing with different widths arranged based on a certain coding rule. The two-dimensional barcode is also referred to as a QR code. It is a readable barcode with another dimension developed based on the one-dimensional barcode (that is, a barcode) and uses black and white (two colors in sharp contrast) rectangles to express binary data. Information can be obtained after the QR code is scanned and parsed. Therefore, in the present disclosure, both the one-dimensional barcode and the two-dimensional barcode can be used as a barcode to store information. Payment or service processing can be performed based on the information.

Step 12: Parse the barcode and perform identity authentication based on account information and a unique ID of the paying terminal obtained through parsing.

In the present step, the process of parsing the barcode is a process of obtaining the information included in the barcode, and can be considered as a reverse process of generating the barcode based on the information. The barcode can include the paying terminal ID and the account information of the account bound with the paying terminal described in step 11. However, to improve security, other authentication information can be added. For example, a time stamp can be included to authenticate whether the barcode is in a valid time range. The time stamp can be delivered by the server to the account terminal, and then transmitted by the account terminal to the paying terminal; or can be directly delivered to the paying terminal (provided that the paying terminal has a network connection function). For example, if a time stamp has a valid time range of 24 hours, when a time length from a current time to the time stamp exceeds 24 hours, the barcode is determined as invalid.

In actual application, to prevent the barcode information from being intercepted or tampered, information used to generate the barcode usually needs to be encrypted. In the authentication process, authentication can be performed at least once. For example, when the paying terminal generates a barcode, information such as the paying terminal ID, the time stamp, the account information, etc. can be encrypted by using a private key sent by the server, and an encryption algorithm is marked. When the server authenticates the barcode, the server first determines content in the barcode based on the marked encryption algorithm by using a relationship that a private key digital signature can be authenticated by using a public key, and then parses the content by using the public key. This is the first authentication. If the content cannot be parsed, payment cannot be made. Then, validity of the time stamp is authenticated based on information such as the paying terminal ID, the time stamp, and the account information obtained through parsing. This is the second authentication. Eventually, the third authentication is performed based on the paying terminal ID, the account information, and the mapping relationship stored in the server, to complete three times of authentication.

In an implementation, to further control a payment action of the paying terminal, the parsing the barcode and performing identity authentication based on account information and a unique ID of the first mobile device obtained through parsing can include: parsing the barcode to obtain the account information and the unique ID of the paying terminal; and querying, based on the account information and the unique ID of the paying terminal, a payment status preconfigured for the paying terminal by the account; and when the payment status is enabled, performing identity authentication based on the account information and the unique ID of the paying terminal.

The payment status can be preconfigured for the paying terminal by the account, and stored in the server. The payment status can include enabled and disabled. The account information and the paying terminal ID can be obtained after the barcode is parsed. Then, the payment status preconfigured for the terminal by the account is queried based on the paying terminal ID. If the payment status is enabled, identity authentication can be performed. If the payment status is disabled, payment failure information can be directly returned.

The payment action of the paying terminal can be better controlled in the method. To be specific, whether the paying terminal can make payment by using the barcode can change at any time.

Step 13: After the authentication succeeds, query a payment limit based on the unique ID of the paying terminal. In the present step, the payment limit is the maximum payment limit in a given time period and preconfigured for the paying terminal by the account bound with the paying terminal.

As described above, the control limit is the total payment limit in a given time period, the payment limit is a limit that can be expended in a given time period, and the billing limit is a used limit in a given time period. In the same given time period, the control limit is the sum of the payment limit and the billing limit. Table 1 shows limits preconfigured for two paying terminals "abcd" and "efgh" bound with account "1234".

TABLE 1

(limit unit: RMB)

| Account name | Paying terminal ID | Control limit | Billing limit | Payment limit | Given time |
|---|---|---|---|---|---|
| 1234 | abcd | 100 | 0 | 100 | Day |
|  | efgh | 500 | 10 | 490 | Week |

It can be queried from the table that payment limits of the paying terminals "abcd" and "efgh" are respectively 100 RMB and 490 RMB.

In the present step, the control limit preconfigured for the paying terminal bound with the account plays an important role in controlling the paying action of the terminal.

Step 14: Make payment based on the queried payment limit. In the present step, payment can be completed when an amount to be used does not exceed the payment limit.

Taking Table 1 as an example, if the paying terminal "abcd" needs to pay 50 RMB, payment can be completed. If the paying terminal "abcd" needs to pay 150 RMB, payment cannot be completed.

Because the control limit remains unchanged, after making one payment, the payment limit decreases while the billing limit increases. For the next payment, a latest payment limit needs to be queried. In an implementation, the method can further include the following steps:

Step 15: Update the payment limit after the payment is completed. In the present step, because the payment limit is the difference between the control limit and the billing limit, after the payment is completed, the payment limit can be updated based on the auto-changing billing limit and the control limit.

For example, as shown in Table 1, after the mobile device "abcd" makes payment of 50 RMB in one day, the billing limit in the day is 50 RMB. Since the control limit is 100 RMB per day, the payment limit in the day is 50 RMB. In actual application, the payment can be set in a plurality of methods. For example, when the amount to be used exceeds the payment limit, payment is completed, and a part exceeding the payment limit is deducted from a control limit in a next given time period. As another example, when the amount to be used exceeds the payment limit, payment is completed but the payment status is changed from enabled to disabled, to better control the payment action. In addition, the disabled time can be prolonged (for example, the payment status is changed to enabled ten given time periods later) to further strengthen control on the payment action.

To better understand the payment action of the mobile device associated with the account, in an implementation, the method can further include step 16: Save payment information after the payment is completed.

In the present step, the payment information can include a payment time and a used limit. For example, 50 RMB is used at 18:00. In addition, the payment information can include merchant information, a transaction number, a transaction type, etc.

In an implementation, the paying terminal in this implementation can be a wearable intelligent device, for example, a smartwatch, an intelligent wristband, a sports band (with a screen). For a kid's smartwatch, a control limit in a given time period is preconfigured to strengthen control on a payment action. In addition, as described in step 15, the payment can be set in a plurality of methods to nurture a kid's self-discipline awareness.

As described in step 11, during binding, the paying terminal ID can include a hardware type. There can be different hardware types, and different solutions for setting a control limit. Different setting solutions corresponding to different hardware types can be stored in the server. For example, a setting solution corresponding to the kid's smartwatch (or a smartwatch for the aged) can be set based on the paying terminal ID. In this method, different paying terminals can be controlled differently.

In the method provided in Implementation 1, after the server receives the barcode used for payment in the mobile device, and the authentication succeeds, payment can be made based on the payment limit preconfigured for the mobile device by the account bound with the mobile device. As such, the barcode-based payment action of each mobile device can be controlled by the account. Therefore, the following problem in the existing technology is resolved: Only the payment action for the account is controlled but control on the payment action of the mobile device is weak.

In addition, the payment status of the mobile device can be set to more flexibly control the payment action of the mobile device in time.

Implementation 2

Figure 2:
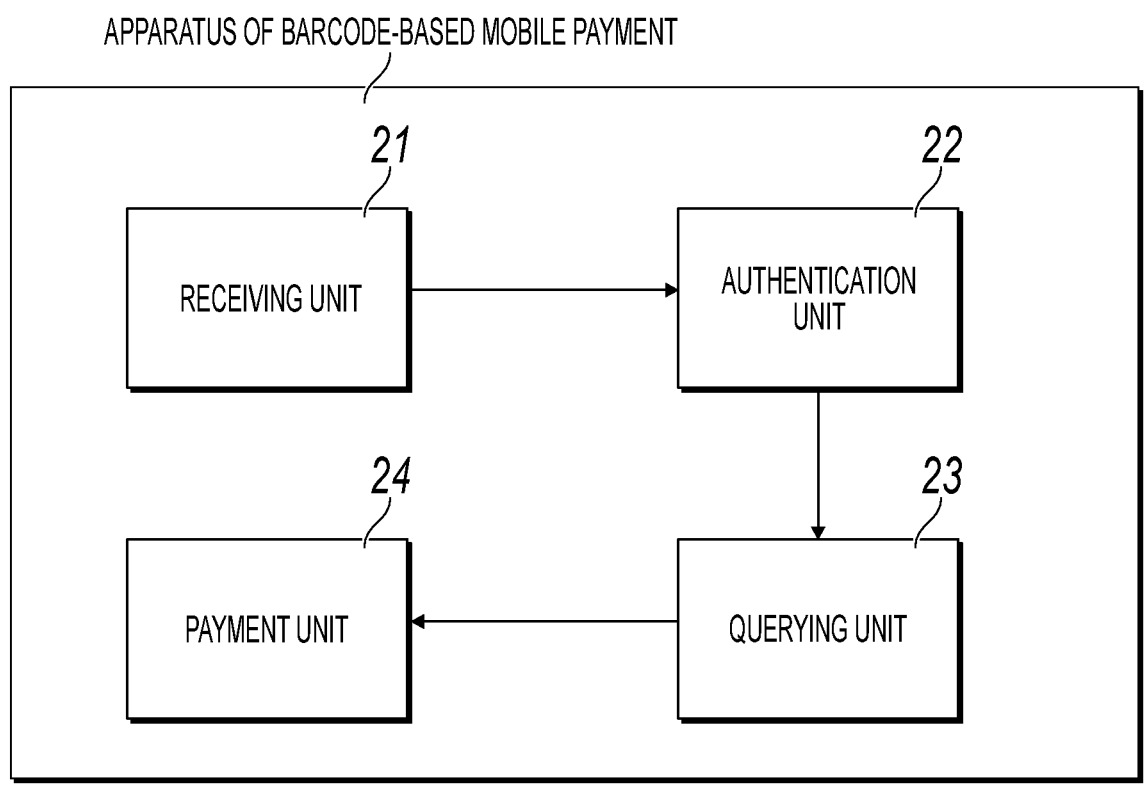
FIG. 2 is a structural block diagram illustrating an apparatus of barcode-based mobile payment, according to Implementation 2 of the present disclosure.

Based on the same disclosing concept, Implementation 2 provides an apparatus of barcode-based mobile payment, to strengthen control on a payment action of a mobile device. As shown in FIG. 2, the device includes: a receiving unit 21, an authentication unit 22, a querying unit 23, and a payment unit 24. The receiving unit 21 can be configured to receive a barcode used for payment in a first mobile device and scanned by a barcode reader. The barcode is generated based on a unique ID of the first mobile device and account information of an account bound with the first mobile device.

The authentication unit 22 can be configured to: parse the barcode and perform identity authentication based on the account information and the unique ID of the first mobile device obtained through parsing.

The querying unit 23 can be configured to: after the authentication succeeds, query a payment limit based on the unique ID of the first mobile device, where the payment limit is the maximum payment limit in a given time period and preconfigured for the first mobile device by the account bound with the first mobile device.

The payment unit 24 can be configured to make payment based on the queried payment limit. In an implementation, the device can further include an updating unit. The updating unit can be configured to update the payment limit after the payment is completed. The payment limit is the difference between a control limit and a billing limit. The control limit is the total payment limit in a given time period and preconfigured for the first mobile device by the account bound with the first mobile device, and the billing limit is a used limit of the first mobile device in a given time period. In an implementation, the device can further include a recoding unit. The recoding unit can be configured to save payment information after the payment is completed. The payment information can include a payment time and a used limit, and can include merchant information, a transaction number, a transaction type, etc.

In an implementation, the authentication unit 22 includes an authentication subunit. The authentication subunit can be configured to: parse the barcode to obtain the account information and the unique ID of the first mobile device; query, based on the account information and the unique ID of the first mobile device, a payment status preconfigured for the first mobile device by the account; and when the payment status is enabled, perform identity authentication based on the account information and the unique ID of the first mobile device.

In an implementation, the account is bound with the first mobile device by using a second mobile device. In an implementation, the first mobile device is a wearable intelligent device, for example, a smartwatch. In an implementation, the account is bound with at least two first mobile devices.

By using the device provided in Implementation 2, after the server receives the barcode used for payment in the mobile device, and the authentication succeeds, payment can be made based on the payment limit preconfigured for the mobile device by the account bound with the mobile device. As such, the barcode-based payment action of each mobile device can be controlled by the account. Therefore, the following problem in the existing technology is resolved: Only the payment action for the account is controlled but control on the payment action of the mobile device is weak.

In addition, the payment status of the mobile device can be set to more flexibly control the payment action of the mobile device in time.

Implementation 3

Figure 3:
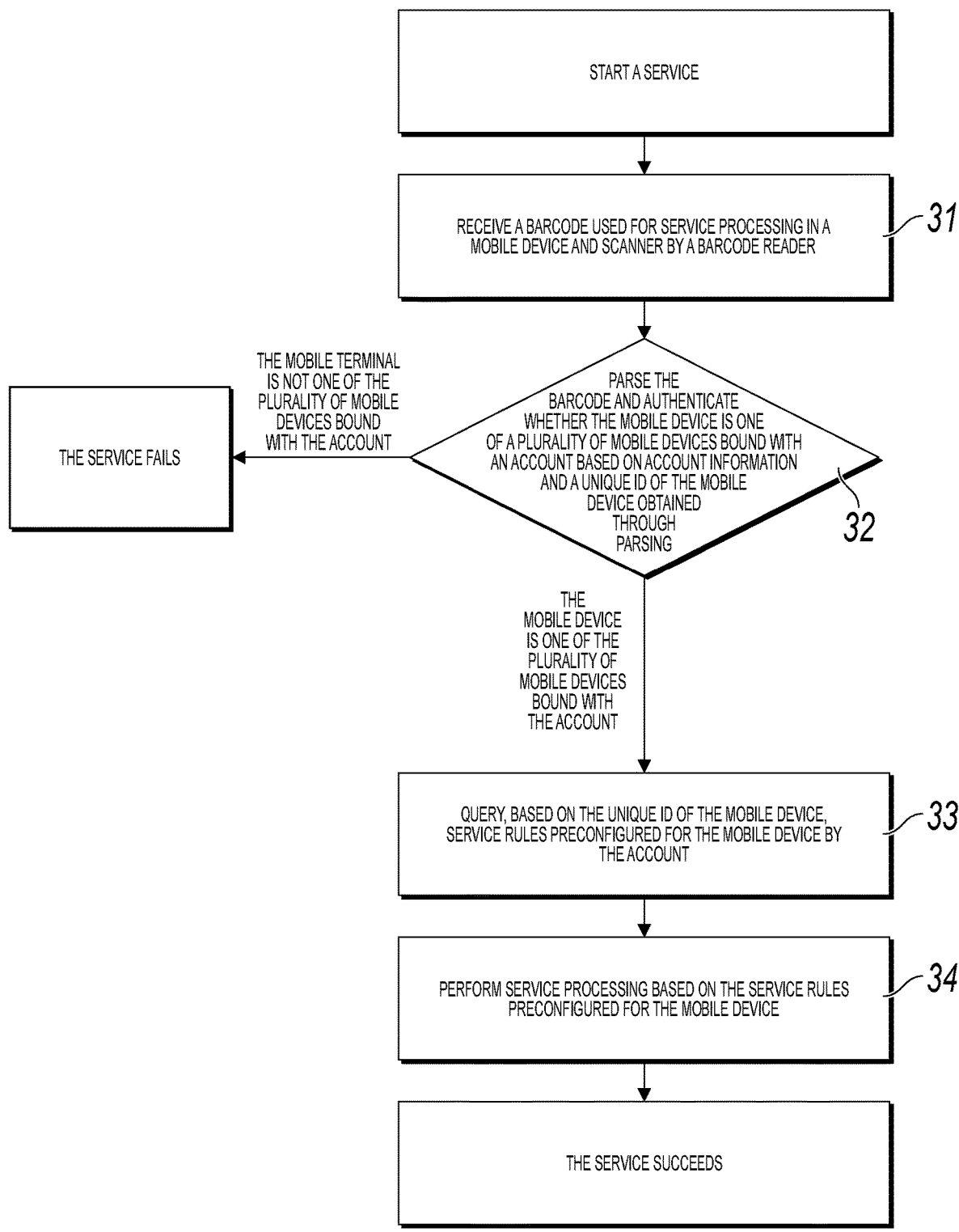
FIG. 3 is a schematic flowchart illustrating a method of barcode-based mobile service processing, according to Implementation 3 of the present disclosure.

As described above, in the existing technology, one account can be bound with one or more mobile devices other than a mobile device that the account belongs, so that the bound mobile device can request a barcode-based service. For example, one account can be bound with only one smartwatch by using a mobile phone that the account belongs. The smartwatch can complete various barcode-based services. With the popularization of intelligent devices, one account needs to be bound with a plurality of mobile devices and every mobile device needs to be managed. Therefore, the present implementation provides a method of barcode-based mobile service processing. The method is applied to a service processing scenario that one account is bound with a plurality of mobile devices. In the present implementation, one account can be bound with a plurality of (at least two) mobile devices other than an intelligent terminal that the account belongs. A binding process can be as follows: The account invokes the Bluetooth function of a mobile phone by using an application program on the mobile phone, and is separately connected to the plurality of mobile devices. A unique ID of each mobile device is obtained; and a mapping relationship between the account and the unique IDs of the plurality of mobile devices is established and stored in a server. To control a service action of each mobile device, a set of service rules (for example, allowed or prohibited services) is preconfigured for each terminal and stored in the server. As shown in FIG. 3, the method includes the following steps:

Step 31: Receive a barcode used for service processing in a mobile device and scanned by a barcode reader.

The barcode can be generated based on a unique ID of the mobile device and account information of an account bound with the mobile device.

For example, one account can be bound with one smartphone and two smartwatches other than a mobile phone that the account belongs. An implementation can be establishing a mapping relationship between the account and each of IDs of the smartwatches and the smartphone, and storing the mapping relationship in the server. When a mobile device needs to execute a service, the mobile device can generate a barcode based on an ID of the mobile device, the account information of the account, and service information, so that the barcode reader can scan the barcode. The barcode in the present implementation can be a one-dimensional barcode or a two-dimensional barcode.

Step 32: Parse the barcode and authenticate whether the mobile device is one of a plurality of mobile devices bound with an account based on account information and a unique ID of the mobile device obtained through parsing.

The barcode can be parsed after being received. A parsing process is not a focus of the present disclosure. Therefore, details are not described here. When the account information and the mobile device ID included in the barcode are obtained through parsing, whether a mapping relationship exists between the account information and the mobile device ID can be queried in the server. Because the account is bound with the plurality of mobile devices, whether the mobile device is one of the plurality of mobile devices bound with the account needs to be queried.

Step 33: If yes, query, based on the unique ID of the mobile device, service rules preconfigured for the mobile device by the account.

If the mobile device is one of the plurality of mobile devices bound with the account, the service rules set for the mobile device by the account can be queried. The service rules can be preconfigured. For example, if the mobile device is a kid's smartwatch, a service rule can be a payment limit (20 RMB per day) etc. If the mobile device is a smartphone for the aged, a family address can be set, so that a taxi can drive the aged home. In addition, a medical record and a health status of the aged can be added, so that the medical record of the aged can be queried in a hospital by using a barcode.

Step 34: Perform service processing based on the service rules preconfigured for the mobile device. After the service rules preconfigured for the mobile device are queried, service processing can be performed.

For example, the method of processing a payment service is described in step 14 in Implementation 1. For another example, when a bank queries personal information such as an ID card by using a QR code on the mobile device, service processing can be performed based on the service rules set for the mobile device. The service rules can be that querying can be performed when a bank queries personal information. To further control a payment action of a paying terminal, in an implementation, the step further includes: querying a service status in the service rules; and when the service status is enabled, performing the step.

For a specific description, refer to description in step 12 in Implementation 1. Details are not described here again.

In the method provided in Implementation 3, after the server receives the barcode used for service processing in the mobile device, and the authentication succeeds, service processing can be performed based on the service rules preconfigured for the mobile device by the account bound with the mobile device. That is, barcode-based service actions of the plurality of mobile devices are separately managed by the account.

Implementation 4

Figure 4:
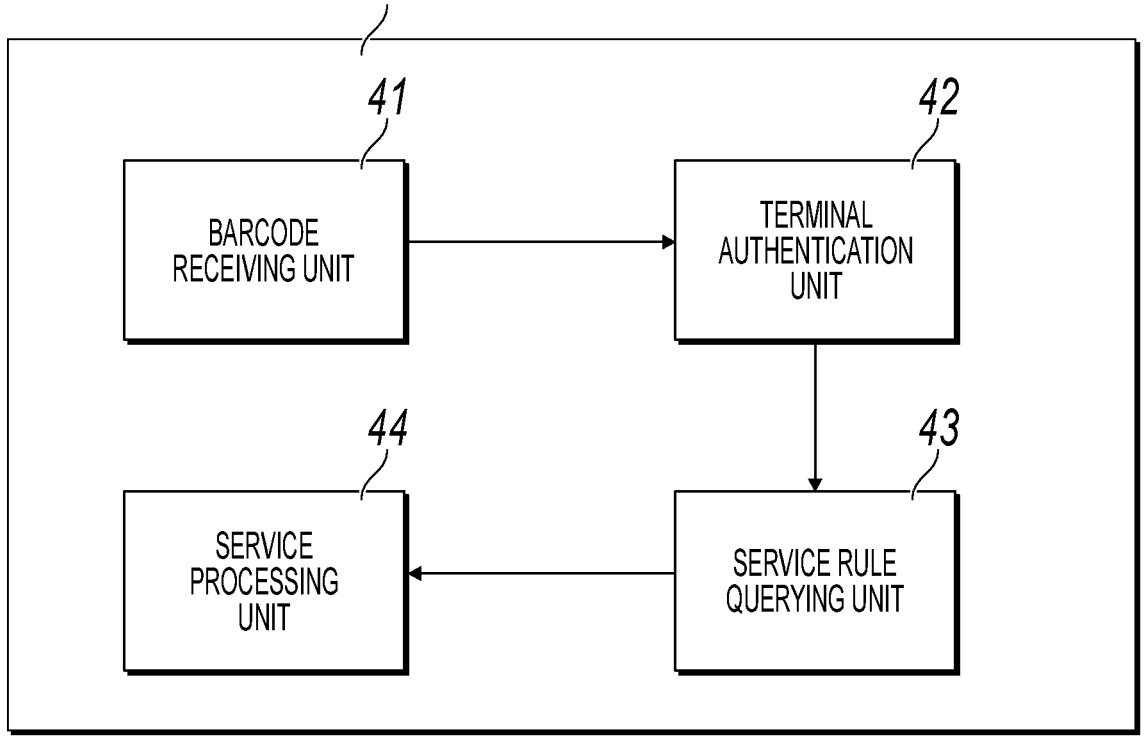
FIG. 4 is a structural block diagram illustrating an apparatus of barcode-based mobile service processing, according to Implementation 4 of the present disclosure.

Based on the same disclosing concept, Implementation 4 provides an apparatus of barcode-based mobile service processing. The device is applied to a service processing scenario that one account is bound with a plurality of mobile devices. In the present implementation, one account is bound with a plurality of mobile devices, and service rules are preconfigured for each mobile device. As shown in FIG. 4, the device includes a barcode receiving unit 41, a terminal authentication unit 42, a service rule querying unit 43, and a service processing unit 44.

The barcode receiving unit 41 can be configured to receive a barcode used for service processing in a mobile device and scanned by a barcode reader. The barcode is generated based on a unique ID of the mobile device and account information of an account bound with the mobile device.

The terminal authentication unit 42 can be configured to: parse the barcode and authenticate whether the mobile device is one of the plurality of mobile devices bound with the account based on the account information and the unique ID of the mobile device obtained through parsing.

The service rule querying unit 43 is configured to: when the mobile device is one of the plurality of mobile devices bound with the account, query, based on the unique ID of the mobile device, service rules preconfigured for the mobile device by the account.

The service processing unit 44 is configured to perform service processing based on the service rules preconfigured for the mobile device.

In an implementation, the service rules include a service status. The service processing unit 44 can be configured to: query the service status in the service rules; and when the service status is enabled, perform service processing based on the service rules preconfigured for the mobile device.

By using the device provided in Implementation 4, after the server receives the barcode used for service processing in the mobile device, and the authentication succeeds, service processing can be performed based on the service rules preconfigured for the mobile device by the account bound with the mobile device. That is, barcode-based service actions of the plurality of mobile devices are separately managed by the account.

Implementation 5

Based on the same disclosing concept, Implementation 5 provides a QR-code-based payment method for a kid's smartwatch, to strengthen control on a payment action of the kid's smartwatch. Assume that a parent has two kids: 'a' and 'b', and each kid has one smartwatch. During binding, the parent establishes a connection between the smartwatches and a mobile phone in a specified application program by using the Bluetooth function of the mobile phone. MAC addresses, UUIDs, and smartwatch types of the smartwatches are obtained to generate smartwatch IDs ("abcd" and "efgh"). A mapping relationship between an account "1234" and each of the smartwatches is established and stored in the server, to complete binding between the account "1234" and the two smartwatches. A control limit is preconfigured for each of the two smartwatches. As shown in Table 2, the parent M sets control limits for the two smartwatches.

TABLE 2

(limit unit: RMB)

| Account name | Smartwatch ID | Remarks | Control limit | Given time | Payment status |
|---|---|---|---|---|---|
| 1234 | abcd | Baby a | 60 | Day | Enabled |
|  | efgh | Baby b | 50 | Day | Enabled |

Figure 5:
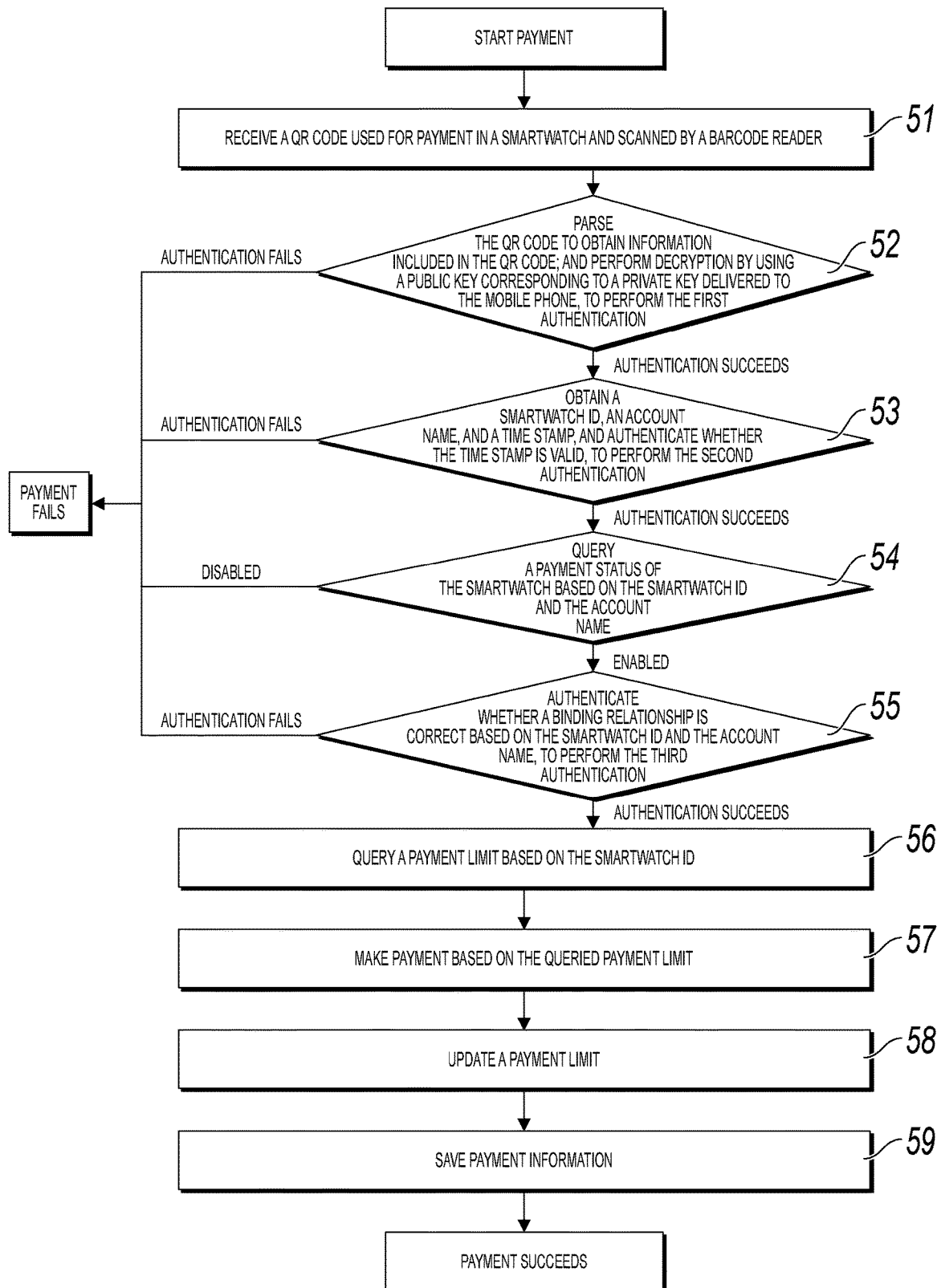
FIG. 5 is a schematic flowchart illustrating a QR-code-based payment method of a kid's smartwatch, according to Implementation 5 of the present disclosure.

The schematic diagram shows a method that kid a makes QR-code-based payment on the smartwatch. Assume that an execution entity is a server configured to complete payment. As shown in FIG. 5, the method includes the following steps:

Step 51: Receive a QR code used for payment in smartwatch "abcd" and scanned by a barcode reader. The QR code is generated based on encrypted information obtained after the smartwatch receives a smartwatch ID, an account name, a time stamp delivered by the server to the mobile phone, an algorithm mark, and a private key transmitted by the mobile phone, and encrypts the smartwatch ID, the account name, and the time stamp based on the algorithm mark by using the private key.

Step 52: Parse the QR code to obtain information included in the QR code; and perform decryption by using a public key corresponding to a private key delivered to the mobile phone, to perform the first authentication.

Step 53: After the authentication succeeds, obtain a smartwatch ID, an account name, and a time stamp, and authenticate whether the time stamp is valid, to perform the second authentication.

Step 54: After the authentication succeeds, query a payment status of the smartwatch based on the smartwatch ID and the account name.

Step 55: When the payment status is enabled, authenticate whether the binding relationship is correct based on the smartwatch ID ("abcd") and the account name ("1234"), to perform the third authentication. It can be determined that the binding relationship is correct based on Table 2.

Step 56: After the authentication succeeds, query a payment limit based on the smartwatch ID ("abcd").

Table 3 shows accounting information of the smartwatch stored in the server.

TABLE 3

(limit unit: RMB)

| Smartwatch ID | Remarks | Control limit | Billing limit | Payment limit | Given time |
|---|---|---|---|---|---|
| abcd | Baby a | 60 | 0 | 60 | Day |
| efgh | Baby b | 50 | 10 | 40 | Day |

Step 57: Make payment based on the queried payment limit. For example, if the payment limit of smartwatch "abcd" is 60 RMB, and a received payment request is 33 RMB, payment is made.

Step 58: Update the payment limit after the payment is completed. Table 4 shows updated accounting information.

TABLE 4

(limit unit: RMB)

| Smartwatch ID | Remarks | Control limit | Billing limit | Payment limit | Given time |
|---|---|---|---|---|---|
| abcd | Baby a | 60 | 33 | 27 | Day |
| efgh | Baby b | 50 | 10 | 40 | Day |

Step 59: Save payment information after the payment is completed. Table 5 shows payment information of smartwatch "abcd".

TABLE 5

| Smartwatch ID | Time | Place | Bill number | Billing limit |
|---|---|---|---|---|
| abcd | 2015/10/25 17:45 | XX restaurant | 10001000 | 33 |

In the method provided in Implementation 5, the payment limit can be preconfigured for the kid's smartwatch bound with the account. Therefore, a QR-code-based payment action is controlled for each kid's smartwatch, so as to strengthen control on kid's consumption awareness. As such, the following problem in the existing technology is resolved: The QR-code-based payment action of the kid's smartwatch can be controlled only by an account of a parent, and the control is weak. For example, the parent is not likely to set the limit to 100, but should control the kid's consumption action. In addition, the payment status of the kid's smartwatch can be set, to more flexibly control the kid's payment action in time.

A person skilled in the existing technologies should understand that the implementations of the present disclosure can be provided as a method, a system, or a computer program product. Therefore, the present disclosure can use a form of hardware-only implementations, software-only implementations, or implementations with a combination of software and hardware. In addition, the present disclosure can use a form of a computer program product implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus of implementing a function in one or more processes in the flowcharts and/or in one or more blocks in the block diagrams.

These computer program instructions can be stored in a computer readable memory that can instruct the computer or any other programmable data processing device to work in a way, so that the instructions stored in the computer readable memory generate an artifact that includes an instruction device. The instruction device implements a function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

In a typical configuration, the computing device includes one or more processors (CPU), an input/output interface, a network interface, and a memory. The memory can include a volatile memory, a random access memory (RAM), a non-volatile memory, and/or another form in a computer readable medium, for example, a read-only memory (ROM) or a flash memory. The memory is an example of the computer readable medium. The computer readable medium includes volatile, non-volatile, movable, and unmovable media that can implement information storage by using any method or technology. Information can be a computer readable instruction, a data structure, a program module, or other data. An example of a computer storage medium includes but is not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, tape and disk storage or another magnetic storage device, or any other non-transmission media that can be configured to store information that a computing device can access. As defined in the present specification, the computer readable medium does not include a transitory computer readable media (transitory media), such as a modulated data signal and a carrier.

It is worthwhile to further note that the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, article, or device that includes the element.

A person skilled in the existing technologies should understand that the implementations of the present disclosure can be provided as a method, a system, or a computer program product. Therefore, the present disclosure can use a form of hardware-only implementations, software-only implementations, or implementations with a combination of software and hardware. In addition, the present disclosure can use a form of a computer program product implemented on one or more computer-usable storage media (including but not limited to a disk memory, a CD-ROM, an optical memory, etc.) that include computer-usable program code.

The previous descriptions are merely the implementations of the present disclosure, and are not intended to limit the present disclosure. For a person skilled in the existing technologies, the present disclosure can have various changes and variations. Any modifications, equivalent substitutions and improvements made in the spirit and principle of the present disclosure shall fall in the scope of the claims in the present disclosure.

Figure 6:
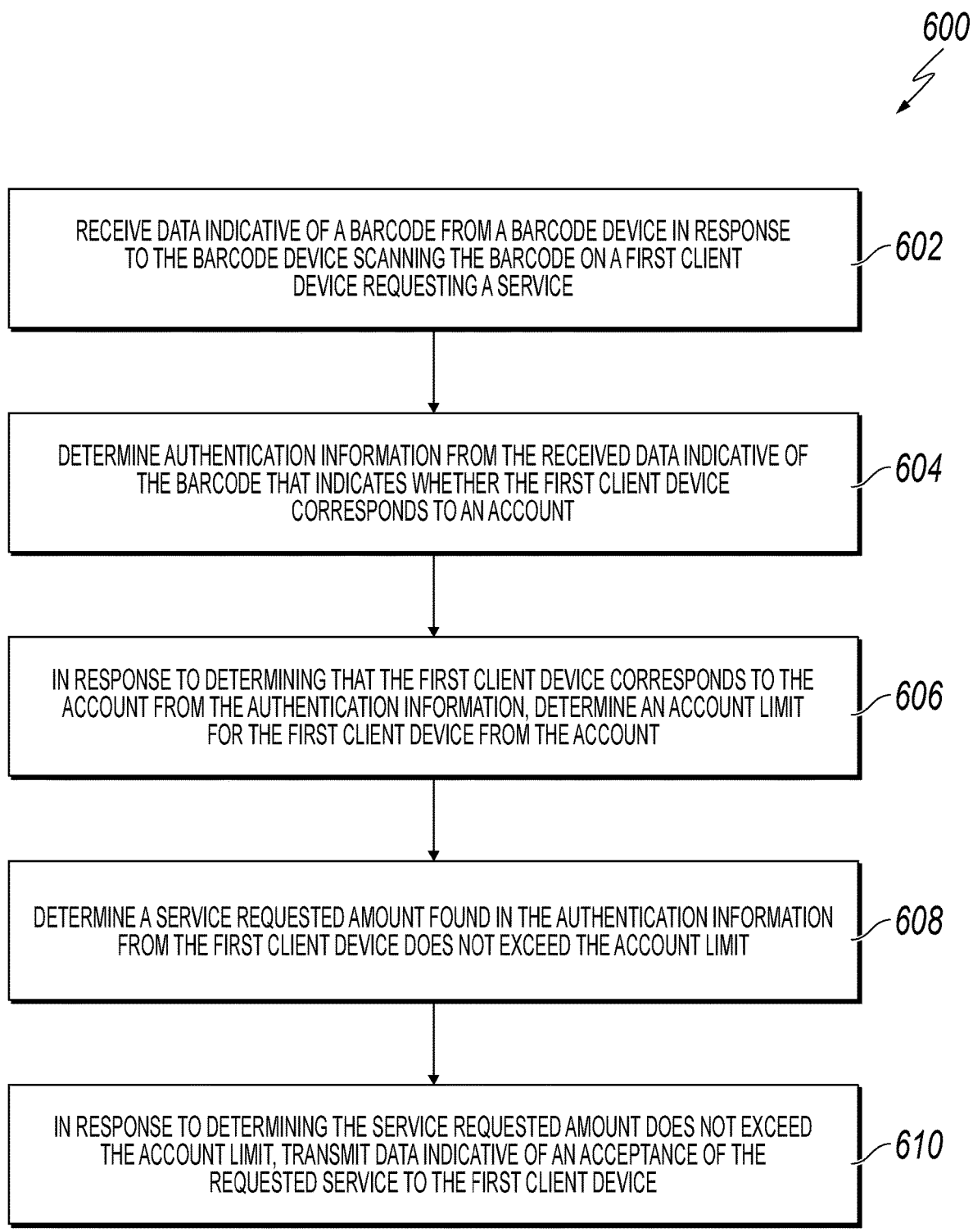
FIG. 6 is a flowchart illustrating an example of a computer-implemented method for barcode-based mobile processing, according to an implementation of the present disclosure.

FIG. 6 is a flowchart illustrating an example of a computer-implemented method 600 for barcode-based mobile processing, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, the server receives data indicative of a barcode from a barcode device in response to the barcode device scanning the barcode on a first client device requesting a service. In some implementation, the first client device, such as a mobile device, displays a barcode to be scanned by a barcode device requesting a service. In other implementations, the first client device can be a wearable intelligent device that links to a second client device. The wearable intelligent device links to a mobile device (e.g., the second client device) and the wearable intelligent device displays a barcode to be scanned by a barcode device for the requested service. The linking between the wearable intelligent device and the mobile device can communicate over a protocol, such as WiFi or Bluetooth, for example. The service can be for payment of a product or providing authentication access to a website, such as a bank or social media, to name a few examples. The barcode can be a one dimensional barcode or a two-dimensional barcode. The barcode can include a representation of a unique ID of the mobile device and account information corresponding to an account of the mobile device. For example, the unique ID of the mobile device may be the mobile device's telephone number or an ID number of the mobile device, such as 001. The account information corresponding to an account of the mobile device can include, for example, a name such as "Phone" or "JohnDevice". The barcode device can scan the barcode from the first client device.

In some implementations, the barcode device can transmit the scanned barcode over a network to a server to process the scanned barcode. In other implementations, the first client device can transmit the barcode to the server without scanning with a barcode scanner. The barcode can be transmitted over the network in one or more forms. For example, the barcode device can transmit the barcode as an image to the server, as binary data, or as a link to a URL that includes the scanned barcode. The server can process the received barcode in each of the one or more forms. From 602, method 600 proceeds to 604.

At 604, the server determines authentication information from the received data indicative of the barcode that indicates whether the first client device corresponds to an account. In some implementations, the server receives the data indicative of the barcode and processes the data. The server extracts from the received data a unique ID of the corresponding mobile device that displayed the barcode and corresponding account information. The server may also parse the barcode to determine the unique ID and the corresponding account information. In some implementations, the server may also retrieve a time stamp from the received data indicative of the barcode. The time stamp may indicate a valid time range in which the barcode is deemed to be valid. For example, the time stamp may have a valid time range of 24 hours. If the server processes the barcode and determines a time extracted from the barcode is outside the valid time range of the barcode, the server will indicate to the client device that the barcode is invalid. If the server determines the time extracted from the barcode is within the valid time range of the barcode, the server proceeds to authenticate the identity of the first client device.

In some implementations, the server authenticates the identity of the client device by comparing the unique ID and the corresponding account information to data from a database. The server can use the unique ID as an index to determine whether the unique ID exists in the database. If the unique ID exists as an index in the database, the server can pull the corresponding account from the database to determine whether it matches the account information extracted from the barcode. For example, if the unique ID of 001 exists as an index in the database, and the server extracts the account "JohnDevice" from the corresponding row of the database, the server can compare the extracted name of the account "JohnDevice" from the database to the account information from the extracted barcode that recites "JohnDevice". In response to the server determining that the account information from the database matches the account information extracted from the barcode, the server can determine that the client device that provided the barcode for display is authenticated with the account. Once the server authenticates the first client device, the server can then determine whether a payment status is configured for the first client device on the account. For example, the account may include the first client device and a second client device that are linked. The first client device is a wearable intelligent device and the second client device is a mobile device that are linked via Bluetooth or WiFi. In other examples, the first client device and the second client device are both mobile devices that are not linked. In the database, the account can include a payment status for the first client device and the second client device. The payment status may be disabled for the first client device and enabled for the second client device. This can indicate to the server that the first client device is not authorized to provide barcodes to the server, only the second client device is allowed. In response to determining that the first client device is not allowed, the server can transmit a notification to the first client device that barcode for the requested service is declined.

The server may also determine that the payment status for the first client device and the second client device are both enabled. In some implementations, the server may first determine whether the client device's payment status is enabled before performing authentication of the client device. In other implementations, the server can perform authentication of the client device before determining whether the client device's payment status is enabled. From 604, method 600 proceeds to 606.

At 606, in response to the server determining that the first client device corresponds to the account from the authentication information, the server determines an account limit for the first client device from the account. The server determines an account limit from the account for the first client device. In some implementations, the account limit can be different for each client device on the account. The account limit can be a control limit for a given time period for a particular time period, as previously mentioned. For example, the account can have a control limit of 100 RMB for each day, split between the first client device and the second client device. For example, if the first client device spends 75 RMB in a day, the second client device and the first client device only has 25 RMB remaining to spend in the day. The control limit amount and the given time period can be preconfigured by a user of the account. In another example, the control limit amount and the given time period can be set by a parental of the user of the account. In another example, the server can determine the control limit amount and the given time period of the account using predictive analytics, based on previous requested amounts by the user of the account. The predictive analytics can use any type of supervised or unsupervised machine learning that seeks to determine an average use of an account limit for each account. From 606, method 600 proceeds to 608.

At 608, the server determines a service requested amount found in the authentication information from the first client device does not exceed the account limit. The server requested found in the authentication information from the barcode can be a particular amount payment amount. For example, if the first client device sends a request for a service for 400 RMB, the server determines whether the account corresponding to the first client device has sufficient funds to pay for the requested service. In particular, the server determines that the control limit on the account is 1000 RMB, the first client device sends a request for a service for 400 RMB, which is the new billing limit. The server determines that the first client device has sufficient funds to pay for the requested service. The remaining balance on the account, which is the payment limit, is 600 RMB. Therefore, the control limit is 1000 RMB, the billing limit is 400 RMB for the requested service, and the remaining amount to use during the day is 600 RMB, which is the payment limit. At a subsequent time in the day, the second client device transmits a request for a service for 200 RMB. The new billing limit is now 800 RMB, the payment limit amount is now 200 RMB, and the control limit remains 1000 RMB. From 608, method 600 proceeds to 610.

At 610, in response to the server determining the service requested amount does not exceed the account limit, the server transmits data indicative of an acceptance of the requested service to the first client device. After the server determines that the service requested amount found in the barcode does not exceed the account limit found in the account from the database, the server generates an acceptance to send to the barcode device. The acceptance can include a message that recites "Payment Accepted" and an indication to provide access to the client device for the requested service. The server transmits the acceptance to the barcode device over the network. In other implementations, the server transmits the acceptance to the client device over the network. The acceptance allows the requested service to be executed on the client device. For example, the server can provide the client device access to the social media website. In another example, the server can provide the client device with an indication that a service has been paid. As a result, the server deducts the billed amount from the payment limit corresponding to the account in the database. After 610, method 600 stops.

The process described above is intended to strengthen control of payment and authentication performed on a client device. In particular, the process includes a server that receives a barcode for a requested service from a barcode device that scanned the barcode on a client device. The barcode includes a unique identifier (ID) of the mobile device and account information corresponding to the account of the client device. The server parses the barcode to perform identity authentication of the client device using the unique ID of the client device and the account information corresponding to the account of the client device. Once the server authenticates the client device, the server determines a payment limit on the account from the control limit and the billing limit. The payment limit indicates how much the client device can pay from the total balance of the control limit and the billing limit includes how much the client device or another client device on the account has already paid. If the server determines that the service payment amount from the extracted barcode information is less than the payment limit on the account, the server makes the payment by providing an acceptance indication to the client device and/or the barcode device. The aforementioned process includes the following benefits: the server can use the barcode to determine a payment bound for an account with one or more devices. Thus, the server can control payments for multiple devices seamlessly through a single account while using a barcode as a means of payment.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method performed by one or more processors, comprising:
   sending, by one or more processors, a private key to a barcode device configured to encrypt data indicative of a barcode;
   receiving, by the one or more processors, encrypted data indicative of the barcode from the barcode device in response to the barcode device scanning the barcode on a first client device requesting a service and based on the private key sent to the barcode device;

decrypting, by the one or more processors, the encrypted data indicative of the barcode using a corresponding public key obtained by the one or more processors to generate data indicative of the barcode;

parsing, by the one or more processors, the data indicative of the barcode using the corresponding public key;

in response to parsing the data indicative of the barcode using the corresponding public key, determining, by the one or more processors, authentication information from the data indicative of the barcode that indicates whether the first client device corresponds to an account;

in response to determining that the first client device corresponds to the account from the authentication information, determining, by the one or more processors, an account limit for the first client device from the account;

determining, by the one or more processors, a service requested amount found in the authentication information from the first client device does not exceed the account limit; and in response to determining the service requested amount does not exceed the account limit, transmitting, by the one or more processors, data indicative of an acceptance of the requested service to the first client device.

2. The computer-implemented method of claim 1, wherein the barcode comprises a one dimensional bar code or a two dimensional bar code.

3. The computer-implemented method of claim 1, wherein the account is linked with a second client device and the first client device.

4. The computer-implemented method of claim 3, wherein the first client device is a wearable intelligent device and the second client device is a mobile device.

5. The computer-implemented method of claim 1, wherein determining the authentication information from the data indicative of the barcode comprises:

determining, by the one or more processors, a unique ID of the first client device from the data indicative of the barcode; and determining, by the one or more processors, account information of the first client device from the data indicative of the barcode.

6. The computer-implemented method of claim 5, further comprising:

determining, by the one or more processors, a preconfigured account status for the first client device in the account that indicates whether the first client device is enabled for use; and in response to determining the preconfigured account status for the first client device is enabled, determining, by the one or more processors, whether the unique ID and the account information of the first client device links to data found in the account.

7. A non-transitory, computer-readable medium storing one or more instructions executable by a computer system to perform operations of one or more processors comprising:

sending, by one or more processors, a private key to a barcode device configured to encrypt data indicative of a barcode;

receiving, by the one or more processors, encrypted data indicative of the barcode from the barcode device in response to the barcode device scanning the barcode on a first client device requesting a service and based on the private key sent to the barcode device;

decrypting, by the one or more processors, the encrypted data indicative of the barcode using a corresponding public key obtained by the one or more processors to generate data indicative of the barcode;

parsing, by the one or more processors, the data indicative of the barcode using the corresponding public key;

in response to parsing the data indicative of the barcode using the corresponding public key, determining, by the one or more processors, authentication information from the data indicative of the barcode that indicates whether the first client device corresponds to an account;

in response to determining that the first client device corresponds to the account from the authentication information, determining, by the one or more processors, an account limit for the first client device from the account;

determining, by the one or more processors, a service requested amount found in the authentication information from the first client device does not exceed the account limit; and in response to determining the service requested amount does not exceed the account limit, transmitting, by the one or more processors, data indicative of an acceptance of the requested service to the first client device.

8. The non-transitory, computer-readable medium of claim 7, wherein the barcode comprises a one dimensional bar code or a two dimensional bar code.

9. The non-transitory, computer-readable medium of claim 7, wherein the account is linked with a second client device and the first client device.

10. The non-transitory, computer-readable medium of claim 9, wherein the first client device is a wearable intelligent device and the second client device is a mobile device.

11. The non-transitory, computer-readable medium of claim 7, wherein determining the authentication information from the data indicative of the barcode comprises:

determining, by the one or more processors, a unique ID of the first client device from the data indicative of the barcode; and determining, by the one or more processors, account information of the first client device from the data indicative of the barcode.

12. The non-transitory, computer-readable medium of claim 11, further comprising:

determining, by the one or more processors, a preconfigured account status for the first client device in the account that indicates whether the first client device is enabled for use; and in response to determining the preconfigured account status for the first client device is enabled, determining, by the one or more processors, whether the unique ID and the account information of the first client device links to data found in the account.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations of one or more processors comprising:

sending, by one or more processors, a private key to a barcode device configured to encrypt data indicative of a barcode;

receiving, by the one or more processors, encrypted data indicative of the barcode from the barcode device in response to the barcode device scanning the barcode on a first client device requesting a service and based on the private key sent to the barcode device;

decrypting, by the one or more processors, the encrypted data indicative of the barcode using a corresponding public key obtained by the one or more processors to generate data indicative of the barcode;

parsing, by the one or more processors, the data indicative of the barcode using the corresponding public key;

in response to parsing the data indicative of the barcode using the corresponding public key, determining, by the one or more processors, authentication information from the data indicative of the barcode that indicates whether the first client device corresponds to an account;

in response to determining that the first client device corresponds to the account from the authentication information, determining, by the one or more processors, an account limit for the first client device from the account;

determining, by the one or more processors, a service requested amount found in the authentication information from the first client device does not exceed the account limit; and in response to determining the service requested amount does not exceed the account limit, transmitting, by the one or more processors, data indicative of an acceptance of the requested service to the first client device.

14. The computer-implemented system of claim 13, wherein the barcode comprises a one dimensional bar code or a two dimensional bar code.

15. The computer-implemented system of claim 13, wherein the account is linked with a second client device and the first client device.

16. The computer-implemented system of claim 15, wherein the first client device is a wearable intelligent device and the second client device is a mobile device.

17. The computer-implemented system of claim 13, wherein determining the authentication information from the data indicative of the barcode comprises:

determining, by the one or more processors, a unique ID of the first client device from the data indicative of the barcode; and determining, by the one or more processors, account information of the first client device from the data indicative of the barcode.

18. The computer-implemented system of claim 17, further comprising:

determining, by the one or more processors, a preconfigured account status for the first client device in the account that indicates whether the first client device is enabled for use; and in response to determining the preconfigured account status for the first client device is enabled, determining, by the one or more processors, whether the unique ID and the account information of the first client device links to data found in the account.

* * * * *